W. E. RUSSELL.
TYPE WRITER.
APPLICATION FILED MAR. 31, 1909.

934,218.

Patented Sept. 14, 1909.
5 SHEETS—SHEET 1.

W. E. RUSSELL.
TYPE WRITER.
APPLICATION FILED MAR. 31, 1909.

934,218.

Patented Sept. 14, 1909.
5 SHEETS—SHEET 2.

Figure 1:
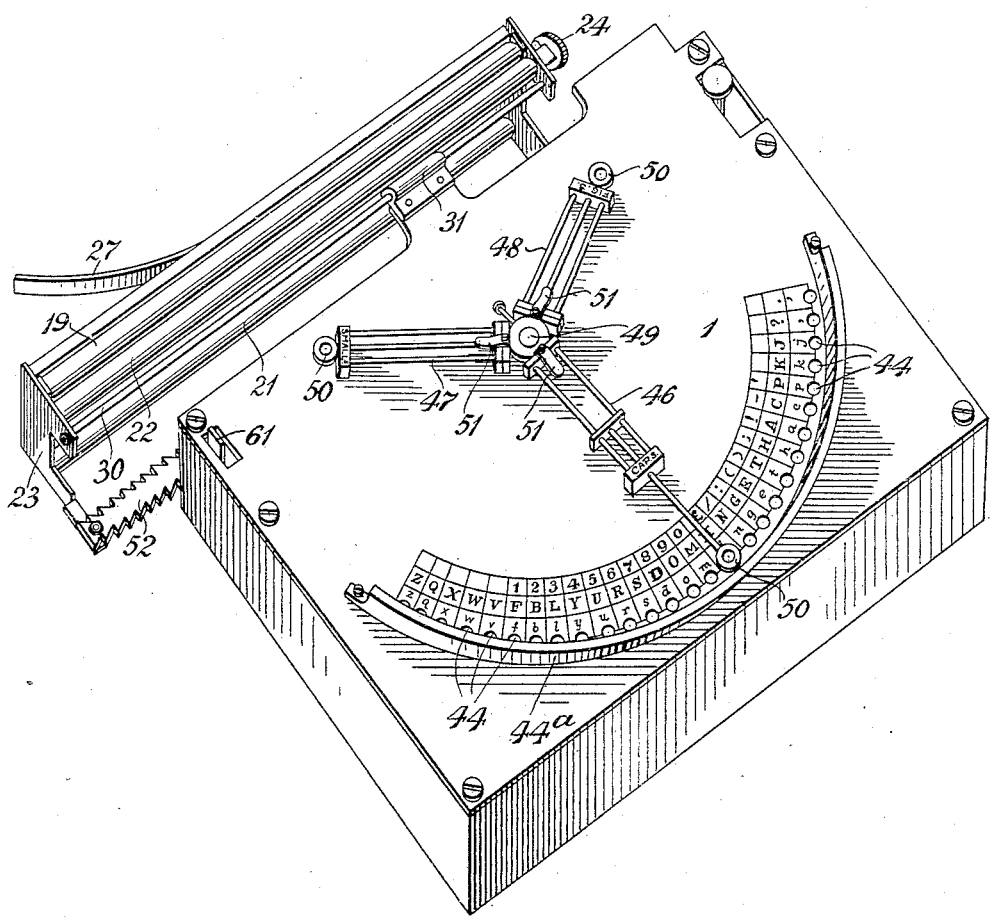

*Fig. 1ª.*

—Witnesses.—
David Furnier
R. L. Farrington

—Inventor.—
William Ernest Russell

By
Attorneys

W. E. RUSSELL.
TYPE WRITER.
APPLICATION FILED MAR. 31, 1909.

934,218.

Patented Sept. 14, 1909.
5 SHEETS—SHEET 3.

Witnesses.

Inventor.
William Ernest Russell
By
Attorneys

W. E. RUSSELL.
TYPE WRITER.
APPLICATION FILED MAR. 31, 1909.

934,218.

Patented Sept. 14, 1909.
5 SHEETS—SHEET 4.

Witnesses.

Inventor:
William Ernest Russell

By

Attorneys

UNITED STATES PATENT OFFICE.

WILLIAM ERNEST RUSSELL, OF STAFFORD, ENGLAND.

TYPE-WRITER.

934,218.      Specification of Letters Patent.    Patented Sept. 14, 1909.

Application filed March 31, 1909. Serial No. 487,039.

*To all whom it may concern:*

Be it known that I, WILLIAM ERNEST RUSSELL, subject of the King of Great Britain and Ireland, residing at 22 Sandon road, Stafford, England, have invented certain new and useful Improvements in Type-Writers, of which the following is a specification, reference being had therein to the accompanying drawings.

This invention has for object to provide a typewriter, which, on account of its simplified and improved construction, can without loss of efficiency be so compactly arranged that it can be conveniently carried in an ordinary coat pocket, its external dimensions not necessarily exceeding five inches square by one inch depth, while its weight need not exceed one pound. To this end there is arranged within an exterior casing, preferably of rectangular form, and of the above-mentioned dimensions, a type-carrying wheel whereon there are mounted to move radially a series of spring-pressed type-bars having the type-characters formed on or attached to their outer ends. By the rotation of the wheel any one of these type-bars can be brought into the printing position, and can be caused to print by the impact of a hammer against its inner end, this impact driving it radially outward against the printing surface, against the action of its spring.

The hammer-actuating mechanism comprises a single main lever mounted in the casing and when depressed acting on the hammer either directly or through spring, lever, or other suitable intermediate mechanism.

The parts of the machine are, for the sake of lightness combined with strength preferably composed mainly of aluminium.

The cases or sets of type are arranged on segments of the type-wheel periphery, and corresponding with each case there is radially mounted on the arbor of the type-wheel above the casing an indicator having at its outer end an eye or loop for the insertion of an operating peg. In the upper face of the casing, immediately over the segmentally shaped extremity of the main lever, there extends a series of holes arranged in an arc, and adjacent to these holes there are marked on the casing the characters corresponding to each set of type. When, by the insertion of the operating peg into the eye of the indicator corresponding to the case or set, and then into one of these holes, the main lever is depressed, the hammer, acting on the type corresponding to the hole, causes the corresponding character to be printed.

The accompanying drawings illustrate examples of typewriters according to this invention; wherein—

Figure 9:
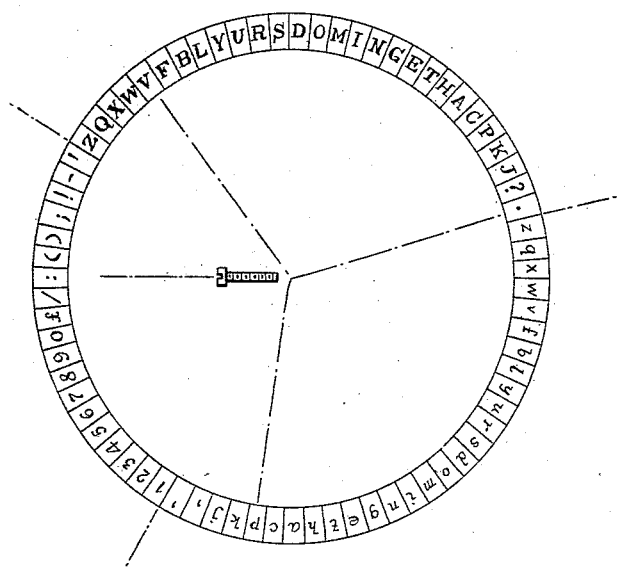
Figure 10:
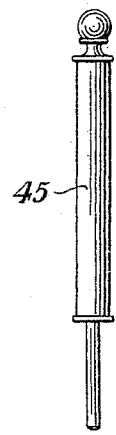
Figure 10:
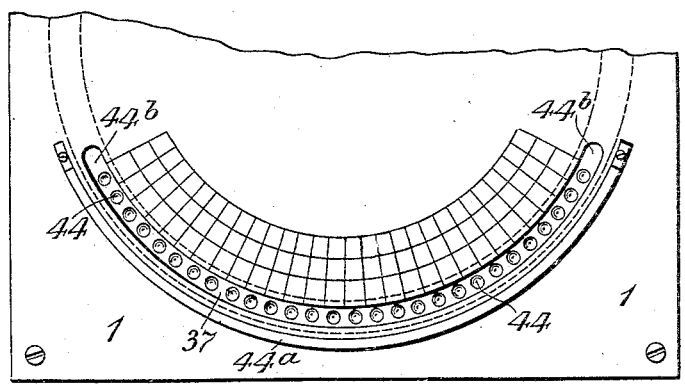
Figure 2:
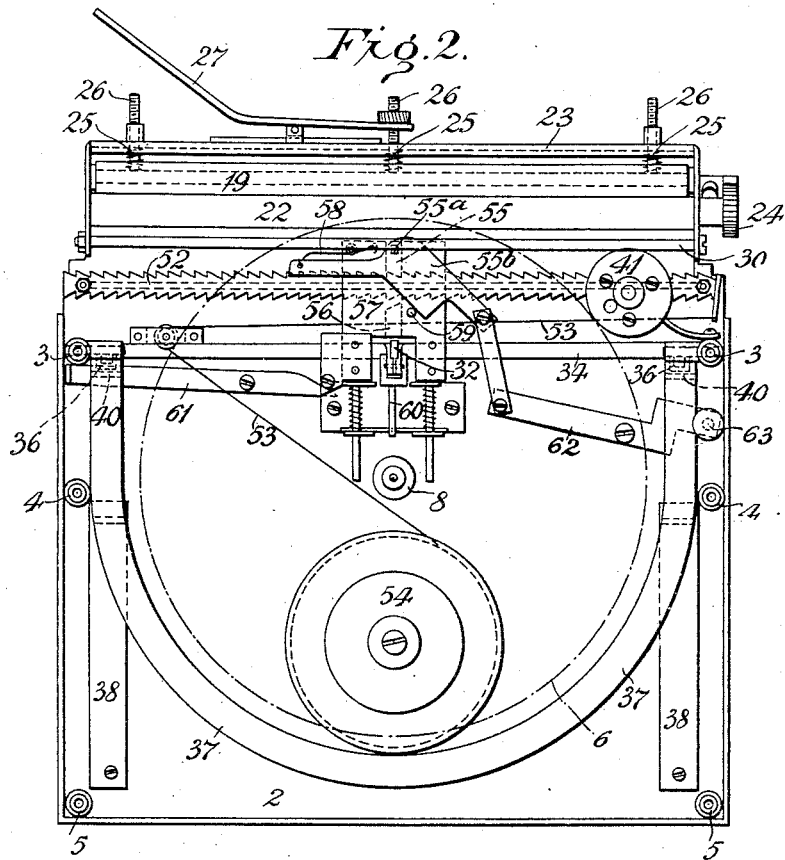
Figure 3:
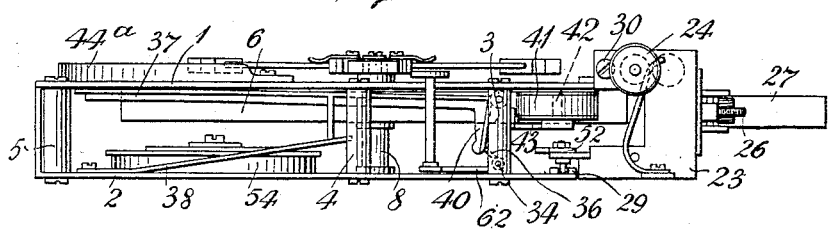
Figure 4:
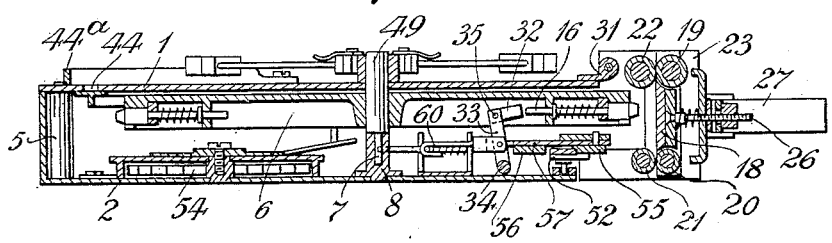
Figure 5:
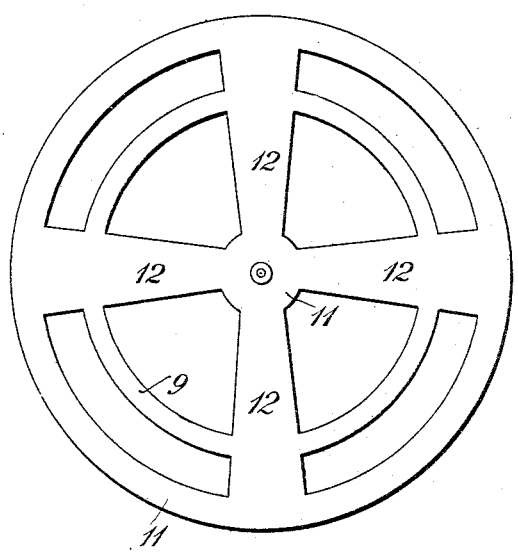
Figure 6:
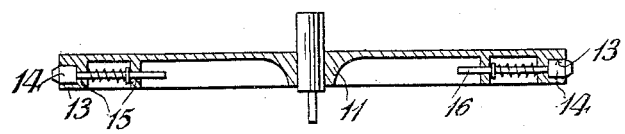
Figure 7:
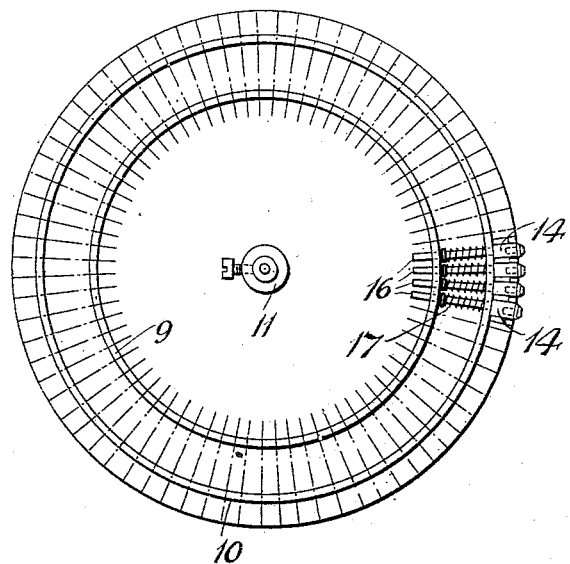
Figure 8:
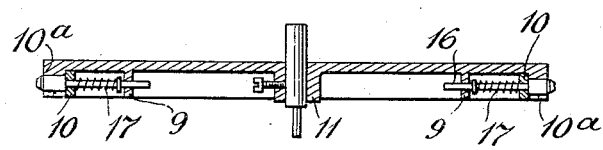

Figure 1 is a perspective view of the typewriter; Fig. 1ᵃ is a plan view of a portion of the top plate illustrating a modification in detail; Fig. 2 is a plan view of the same with the top plate and parts above it removed, and with the position of the type wheel diagrammatically indicated; Fig. 3 is an end elevation with the top plate and parts above it and the type-wheel in position; Fig. 4 is a central transverse section through the typewriter; Figs. 5 and 6 show one construction of type-wheel in plan and central section; Figs. 7 and 8 show in plan of underside and section an alternative construction of type-wheel; Fig. 9 diagrammatically indicates the arrangement of type on the wheel, and Fig. 10 shows the operating peg.

The mechanism of the machine is arranged between two plates 1, 2, preferably about three-quarters of an inch apart, and is supported by three pairs of pillars 3, 4, 5, respectively.

The type-wheel 6 may suitably be four inches in diameter, and a quarter of an inch deep. One end of its arbor 7 rests in a stud 8 on the lower plate 2, while the other end passes through the top plate 1, and projects upward about a quarter of an inch. According to one construction shown in Figs. 5 and 6, the wheel 6 comprises an inner rim 9 and an outer rim 10, a hub 11 and four arms 12, suitably one-thirty-second of an inch in thickness, stretching from the center across the two rims, and holding them together. The outer rim 10 has an inlet, or peripheral groove 13, say three-sixteenths of an inch wide and of exactly the depth, (say one-eighth of an inch) of the studs 14 containing the characters. Equidistant holes 15 are drilled from the center of the groove or inlet 13 through the rims 9 and 10. The inlet or groove 13 contains the type heads 14 and the type-bars 16 are mounted to slide in the holes 15.

In the alternative construction of type-wheel shown in Figs. 7 and 8 the outer rim on the type-wheel disk consists of a ring 10 furnished with holes for the type-bars 16 and inserted within a series of projections 10ª with intervening recesses for the reception of the type heads 14.

Each type-bar 16 is fitted between the rims 9 and 10 with a coil spring 17, sufficiently sensitive for the type-character to be easily pressed radially outward for impressions and yet strong enough to secure its return, the holes in the rims and in the inlet groove or recesses acting as guides.

The number of characters contained in the wheel is in the example shown seventy-five, though the number may obviously be varied.

Preferably the typing is effected on a flat surface 18 hereinafter called the typing board, and not on a roller, as usual in typewriters. The advantage of this is that post cards and envelops can be used without unshaping them. Two small rollers 19, 20, are fitted at the top and bottom of the typing board, and two rollers 21, 22 are mounted in the carriage 23 just in advance of the typing board. These four rollers keep the paper in position and effect its passage through the machine. The roller 22 is furnished with a milled head 24 for turning the paper up and down. The typing-board 18 is fitted at the back with three springs 25 that press it and the rollers 19, 20, lightly against the rollers 21, 22, thus allowing thick paper or card to pass through the machine, while very thin paper is at the same time firmly held therein. These springs may be flat, but are preferably coiled around pins 26 that are attached to the typing-board and pass through the back plate of its container or carriage 23; and on the back of the carriage there may be provided a lever 27 acting on the central pin 26 to move the two pairs of rollers apart for the insertion of paper, against the action of the springs 25.

The bottom part of the typing-board container or carriage 23 is placed in a rail 29; the top part is fitted with a bar 30 which passes through a socket 31 attached to the top plate 1 of the machine. The rail 29 and the socket 31 keep the typing-board container 23 steady, and allow an easy movement from one side of the machine to the other. The characters are moved forward from the wheel toward the typing-board 18 by means of a hammer 32 which presses on the end of a type-bar 16 projecting through the inner rim of the wheel. The hammer 32 is hinged to a peg 33 pointing upward from the base, and fixed to a spindle 34 which describes an arc of a circle whenever the machine is operated. The hinge 35 between the hammer and the peg obviates any friction which might otherwise result from the circular movement of the peg. The ends of the spindle 34 are placed in holes drilled into the lower part of the two pillars 3 nearest the typing board 18. The peg 33 of the hammer is fixed upright in the center. Two levers 36 are fixed to the spindle 34 near its ends and actuated by the main lever 37. The main lever 37 is an approximately semi-circular flat piece of metal hinged to the top of the pillars 3 nearest the typing-board, passing round the opposite side of the wheel 6, and raised to the level of this wheel by means of a pair of flat springs 38 riveted to the bottom plate 2. Directly over the raised ends of the levers two feet 40 project downward and rearward from the main lever 37, and when the main lever is pressed down these feet move the levers 36 and effect the typing.

The inking may be accomplished by means of a small round pad 41 which rotates on an upright spindle 42. The lower end of the spindle, below the pad, is mounted on a flat metal arm 43 tempered to spring, so that the pad 41 is in constant contact with the type-wheel 6, and inks the characters as they successively touch it when the wheel is turned round, the spring preventing any excess of pressure between the pad and the wheel. A hollow may be formed in the upper part of the pad to facilitate the occasional renewal of the supply of ink.

According to the arrangement shown in Fig. 1, the top plate 1 of the machine has a succession of holes 44, twenty-eight in number in the example shown, drilled equidistant from the center of the type-wheel and from each other, and at such an angle that the distance between them corresponds exactly to the distance between the type fitted in the wheel, that is, in the example shown, one seventy-fifth of the circle. The typist is supplied with an operating peg 45 which he passes through one of these holes, presses down the main lever 37, and thus works the machine; and adjacent to the holes 44 is a guide rail 44ª for this peg while typing.

In the modified arrangement shown in Fig. 1ª there is substituted for the holes 44 of Fig. 1 a continuous slot 44ᵇ above the front portion of the main lever 37; and in this lever there are provided cup-shaped depressions 44 for the end of the operating peg 45.

Three indicators 46, 47, 48 are attached to the top of the arbor 49 of the type-wheel 6 where it projects above the top plate 1. At the outer ends of these indicators there are holes or eyes 50 through which the operating peg 45 must be passed when it is used in typewriting. As the peg passes from one hole to another it carries the indicator with it, and thus turns the type-wheel, and puts the required characters into position for typing. The indicators are variable in length. When closed they are short enough to pass the socket 31 or any paper that may be moving through the machine; when open they are long enough to reach the holes 44 over the main lever. The indicators out of use are prevented from opening themselves as they swing round the machine by means of the pressure of flat springs 51, or equivalent coil springs fitted to the middle bars of the indicators. The indicator 46 is for the full stop and capitals, 47 is for the comma and small letters, and 48 is for numbers and other punctuations and signs; and segmentally arranged on the top plate 1 adjacent to the holes 44 are corresponding series of character indications.

According to the arrangement of spacing mechanism shown in Figs. 2 to 4, the container or carriage 23 carries a notched bar 52 having notches on two opposite sides, toward the typing board, and toward the center of the type wheel. The notches point toward the left hand side of the machine and the notched bar is drawn by a cord 53 attached at one end to the bar, and at the other end to a spring drum 54, arranged on the bottom plate 2 under the main lever 37.

The action of the cord 53 and spring 54 is regulated by two detents 55, 56 carried by a sliding plate 57. The ratchet 56 is secured to the lower side of this plate, while the detent 55 which also lies beneath the plate 57, is connected by a pin 55$^a$ passing through this plate, with a rocking plate 55$^b$. When the machine is not in operation the notched bar 52 is held at rest by the detent 55 on the typing board side. When the hammer is pressed forward it moves the ratchet plate 57 forward so that the notched bar is still held in the same position by the detent 56 fixed on the inner side of the plate 57. The loose detent 55 on the typing-board side being thus released from the pressure of the notched bar is by a spring 58 acting on an arm of the plate 55$^b$ turned together with this plate through an angle sufficient to insure that when the detent plate 57 returns to its original position the detent 55 will fall into the adjacent notch to the right, and the cord 53 and spring 54 will carry the typing-board forward.

The plate 55$^b$ carrying the loose ratchet 55 effecting the spacing is stopped on the one side by a stud 59 in the ratchet plate, so that the notched bar cannot move more than the desired distance while on the other side it is free except for the pressure of the light spring 58, so that with little pressure on the container the notched bar can be moved in a reverse direction.

The hammer 32 is so connected by a loop 60 with the ratchet plate 57 that though the hammer cannot move without sliding the ratchet plate, the ratchet plate can be moved without the hammer to effect the spacing between words. This movement is effected by means of a lever 61 fixed across the machine and operated from the side. The ratchet 55 can when desired be turned out of engagement with the notched bar to free the carriage by first moving forward the plate 57 by the lever 61 and then rocking the plate 55$^b$ to bring the ratchet clear of the bar by means of a lever 62 provided with a knob 63 and releasing the lever 61.

It will be seen that the arrangement of the type-bars of all the cases or sets on a single type-wheel so that any type can be brought into printing position by means of the indicator corresponding to its set, and then actuated through a single hammer and main lever, secures great simplicity and compactness and enables a serviceable typewriter to be constructed of very small weight and dimensions. In the example shown the entire mechanism is compactly arranged in a thin flat rectangular casing that can be easily carried in the coat pocket. It will, moreover, be understood that ratchet mechanism of various known types may be adapted for moving the carriage, such mechanism being actuated by depression of the main lever as herein set forth.

What I claim is:—

1. In a typewriter the combination of a rotatable type wheel; type bars mounted therein to be movable radially outward and bearing type on their outer ends; springs seated in the type-wheel for normally retaining said type bars in their inner positions; an indicator attached to said type wheel whereby this wheel can be rotated to bring a desired type bar into printing position; a hammer adapted by impact on the inner end of said type bar to drive the same radially outward to print from its type; a main lever having a segmental free end; mechanism connecting said main lever and hammer to actuate the hammer upon depression of the lever; and a top plate that extends above said main lever, bears character indications, and is perforated adjacent to said character indications and above the segmental end of said main lever to admit of the entry of a peg for actuating said main lever.

2. In a typewriter the combination of a rotatable type wheel; type bars mounted therein to be movable radially outward and bearing on their outer ends type arranged in cases or sets, each occupying a segment of the periphery of the type-wheel; springs seated in the type wheel for normally retaining said type bars in their inner radial positions; an indicator corresponding to each case or set of type, said indicator being attached to the type wheel for rotating it to bring any desired type bar of the said case into printing position; a hammer adapted by impact on the inner end of said type bar to drive the same radially outward to print from its type; a main lever having a segmental free end; mechanism connecting said main lever and hammer to actuate the hammer upon depression of the lever; and a top plate that extends above said main lever, bears character indications, and is perforated adjacent to said character indications and above the segmental end of said main lever to admit of the entry of a peg for actuating said main lever.

3. In a typewriter the combination of a rotatable type wheel; type bars mounted therein to be movable radially outward and bearing type on their outer ends; springs seated in the type-wheel for normally retaining said type bars in their inner positions; an indicator attached to said type wheel whereby this wheel can be rotated to bring a desired type bar into printing position; a hammer adapted by impact on the inner end of said type bar to drive the same radially outward to print from its type; a main lever having a segmental free end; mechanism connecting said main lever and hammer to actuate the hammer upon depression of the lever; a top plate that extends above said main lever, bears character indications, and is perforated adjacent to said character indications and above the segmental end of said main lever to admit of the entry of a peg for actuating said main lever; and a printing surface comprising a flat typing board, springs arranged at the rear of said board, and a pair of rollers at the upper and at the lower edge of said board.

4. In a typewriter the combination of a rotatable type wheel; type bars mounted therein to be movable radially outward and bearing on their outer ends type arranged in cases or sets, each occupying a segment of the periphery of the type-wheel; springs seated in the type wheel for normally retaining said type bars in their inner radial positions; an indicator corresponding to each case or set of type, said indicator being attached to the type wheel for rotating it to bring any desired type bar of the said case into printing position; a hammer adapted by impact on the inner end of said type bar to drive the same radially outward to print from its type; a main lever having a segmental free end; mechanism connecting said main lever and hammer to actuate the hammer upon depression of the lever; a top plate that extends above said main lever, bears character indications, and is perforated adjacent to said character indications and above the segmental end of said main lever to admit of the entry of a peg for actuating said main lever; and a printing surface comprising a flat typing board, springs arranged at the rear of said board, and a pair of rollers at the upper and at the lower edge of said board.

5. In a typewriter the combination of a rotatable type wheel; type bars mounted therein to be movable radially outward and bearing type on their outer ends; springs seated in the type-wheel for normally retaining said type bars in their inner positions; an indicator attached to said type wheel whereby this wheel can be rotated to bring a desired type bar into printing position; a hammer adapted by impact on the inner end of said type bar to drive the same radially outward to print from its type; a main lever having a segmental free end; mechanism connecting said main lever and hammer to actuate the hammer upon depression of the lever; a top plate that extends above said main lever, bears character indications, and is furnished with a series of perforations adjacent to and corresponding with said character indications to admit of the entry of a peg for actuating said main lever; a printing surface comprising a flat typing board, springs arranged at the rear of said board, and a pair of rollers at the upper and at the lower edge of said board.

6. In a typewriter the combination of a rotatable type wheel; type bars mounted therein to be movable radially outward and bearing on their outer ends type arranged in cases or sets, each occupying a segment of the periphery of the type-wheel; springs seated in the type wheel for normally retaining said type bars in their inner radial positions; an indicator corresponding to each case or set of type, said indicator being attached to the type wheel for rotating it to bring any desired type bar of the said case into printing position; a hammer adapted by impact on the inner end of said type bar to drive the same radially outward to print from its type; a main lever having a segmental free end; mechanism connecting said main lever and hammer to actuate the hammer upon depression of the lever; a top plate that extends above said main lever, bears character indications, and is furnished with a series of perforations adjacent to and corresponding with said character indications to admit of the entry of a peg for actuating said main lever; a printing surface comprising a flat typing board, springs arranged at the rear of said board, and a pair of rollers at the upper and at the lower edge of said board.

In testimony whereof I affix my signature in the presence of two witnesses.

WILLIAM ERNEST RUSSELL.

Witnesses:
MARTHA RUSSELL,
FANNY BROADHURST.